US009219995B2

(12) United States Patent
Eric (10) Patent No.: US 9,219,995 B2
(45) Date of Patent: Dec. 22, 2015

(54) NETWORK ENTITY AND METHOD FOR PROVIDING A SERVICE FOR USER ENTITY IN A COMMUNICATION NETWORK

(75) Inventor: Villier Eric, Boulogne-Billancourt (FR)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/604,300

(22) Filed: Sep. 5, 2012

(65) Prior Publication Data

US 2012/0327807 A1    Dec. 27, 2012

Related U.S. Application Data

(63) Continuation of application No. PCT/CN2010/070895, filed on Mar. 5, 2010.

(51) Int. Cl.
*H04W 4/08* (2009.01)
*H04W 8/18* (2009.01)

(52) U.S. Cl.
CPC ............... *H04W 4/08* (2013.01); *H04W 8/186* (2013.01)

(58) Field of Classification Search
CPC ... H04W 72/04; H04W 72/00; H04W 72/042; H04W 72/005; H04W 72/0453; H04W 72/1294; H04W 72/048; H04W 72/0493; H04W 36/0083; H04W 16/00; H04W 24/02; H04W 28/06; H04W 28/065; H04W 28/22; H04W 28/26; H04W 4/08; H04W 40/246; H04W 8/186

USPC .............. 370/401, 912, 254, 252, 236, 236.1, 370/236.2, 230, 341, 437, 461–462, 902, 370/351; 709/227, 223, 220, 249

See application file for complete search history.

(56) References Cited

U.S. PATENT DOCUMENTS

| | | | |
|---|---|---|---|
| 6,163,697 A * | 12/2000 | Peterson et al. | 455/450 |
| 7,031,281 B1 * | 4/2006 | Zhang | 370/335 |
| 2003/0153340 A1 | 8/2003 | Crockett et al. | |

(Continued)

FOREIGN PATENT DOCUMENTS

| | | |
|---|---|---|
| CN | 1437359 A | 8/2003 |
| CN | 1568630 A | 1/2005 |

(Continued)

OTHER PUBLICATIONS

"3rd Generation Partnership Project; Technical Specification Group Radio Access Network; Radio Resource Control (RRC); Protocol Specification (Release 9)", 3GPP TS 25.331 V9.0.0, Sep. 2009, 1710 pages.

(Continued)

*Primary Examiner* — Benjamin H Elliott, IV
*Assistant Examiner* — Eric Nowlin (57) ABSTRACT

A network entity comprises a detector for detecting at least one behavior indication indicating a behavior of the user entity during a communication towards the communication network, an allocator for allocating said user entity to a certain user entity group from a plurality of user entity groups in dependence on the detected at least one behavior indication, said certain user entity groups being respectively associated with a different set of management parameters adjusting said service, and an adjuster for adjusting said service for said user entity in dependence on the set of management parameters associated with the certain user entity group.

15 Claims, 4 Drawing Sheets

(56) References Cited

U.S. PATENT DOCUMENTS

| | | |
|---|---|---|
| 2006/0136638 A1* | 6/2006 | Banning et al. ............... 710/244 |
| 2007/0201369 A1 | 8/2007 | Pedersen et al. |
| 2007/0259673 A1 | 11/2007 | Willars et al. |
| 2008/0008106 A1 | 1/2008 | Boberg et al. |
| 2008/0039032 A1 | 2/2008 | Haumont |
| 2009/0124249 A1* | 5/2009 | Young et al. ............... 455/422.1 |

FOREIGN PATENT DOCUMENTS

| | | |
|---|---|---|
| CN | 1885832 A | 12/2006 |
| CN | 101406097 A | 4/2009 |
| EP | 2 061 192 A1 | 5/2009 |
| RU | 2004127453 A | 1/2006 |
| RU | 2007127985 A | 1/2009 |

OTHER PUBLICATIONS

Written Opinion of the International Searching Authority dated Dec. 9, 2010 in connection with International Patent Application No. PCT/CN2010/070895.

International Search report dated Dec. 9, 2010 in connection with International Patent Application No. PCT/CN2010/070895.

* cited by examiner

NETWORK ENTITY AND METHOD FOR PROVIDING A SERVICE FOR USER ENTITY IN A COMMUNICATION NETWORK

CROSS-REFERENCE TO RELATED APPLICATIONS

This application is a continuation of International Application No. PCT/CN2010/070895, filed Mar. 5, 2010, titled "Network entity and method for providing a service for a user entity in a communication network", the entire content of which is incorporated herein by reference.

BACKGROUND

The present invention relates to mobile communications over communication networks.

Conventional radio communication systems, such as a $2^{nd}$ generation system, e.g. a Global System for Mobile Communications (GSM) or a $3^{rd}$ Generation Partnership Project (3GPP) system, e.g. a Universal Mobile Telecommunications System (UMTS) or Long Term Evolution (LTE), provide a respective certain service, e.g. Quality of Service (QoS), to its connected mobile terminals or user entities.

For example, conventional wireless mobile networks offered and offer services, like voice services or data services, for which there was no necessity or use for differentiating the type of devices used by the end user. A reason for this is that there was not a big variety in applications run by these devices.

Further, with the availability and fast growth of mobile broadband capabilities, a great variety of different applications become available on a growing range of mobile devices. Such new mobile devices, which may be also called smart phones, may behave quite differently compared to previous generations of mobile devices, so called traditional phones. Essentially, the smart phones are a kind of mobile computers capable of running a variety of applications making use of wireless technology. For example, for each relevant application and according to the mobile device or the application parameters configuration, smart phones may probe the communication network regularly and periodically, instead of just relying on the intervention or action of the user for starting a particular service.

An example for such an application is e-mail. In this example, the client application running on the smart phones may connect automatically and periodically to the server to check for new mails or to synchronize a number of folders, like contacts, e-mails or the like.

Further examples may include the applications of so called social networks, wherein the client may automatically and periodically connect to other network entities to check for their status, e.g. the status of contacts, messages or the like.

Above mentioned applications may create small packet data sessions periodically and frequently. As a result, they generate a great number of signalling messages. Thus, a direct impact on a communication network is that the rules commonly applied to dimension the communication network for a user plane, i.e. data traffic, and a control plane, i.e. signalling, may be not longer applicable, in particular because the introduction of smart phones capable of running above mentioned applications may create unforeseen capacity problems in the communication network, especially in the control plane. An obvious solution of increasing the network capacity may be expensive, in particular in requiring more hardware and software capacities.

SUMMARY

The present invention provides a differentiated service for different user entities in a communication network, in particular in a Radio Access Network (RAN). In particular, the service, e.g. the Quality of Service (QoS), may be provided for a certain user entity in dependence on its behaviour during a communication towards the communication network.

According to some implementation forms, the network entity enables an operator to control more effectively with more flexibility the different mixes of user entities present in the communication network. In particular, the present network entity may allow an operator to minimize the impact on his communication network capacity of new user entities and new services in an efficient and cost-effective way, in particular without requiring new sites or new hardware or site visits.

According to some implementation forms, different services may be provided for different types of user entities, the user entities differing in their behaviour during the communication e.g. in their capabilities, in their performances, such as radio sensitivity, in their behaviours according to certain algorithms embedded in the user entity, like power control in 3G systems, and/or in their degree of compliance with respect to certain standards. I.e., some specific types of user entities may not behave according to the expectation in some areas. Here, examples may include Compressed Mode and Wide-Band Adaptive Multi-rate (WB-AMR).

As already indicated above, with the availability and the fast growing of mobile broadband systems, an increasing number of applications is available on a greater range of user entities or user devices. In particular, with the adoption of "always-on" experience, such user entities or devices, like smart phones, may behave quite differently compared to their previous generations.

For example, if a device supplier releases a particular model of a user entity which shall be only available by a particular operator, at least for a definite introduction period, an exclusivity and promotional operation may be possible. Thus, in such cases, it may be possible that such a particular operator wants his network infrastructure to serve these particular user entities in a certain way. In this regard, the present invention gives a technical opportunity to provide such a certain way by providing a service differentiation based on the behaviours of the user entities.

The suggested service differentiation may be done in many aspects. For example, the throughput may be increased for certain user entities by providing them more resources. Further, certain user entities may be given a higher priority in assessing the communication network so that they have the ability to pre-empt other entities.

Another example may be to use different values of parameters for user entities to improve their user experience. In this regard, the network entity, e.g. a RAN entity, may be aware of the types of the user entities being used for the communication towards the communication network.

In sum, the differentiation of the service experience offered to the end user may be not dependent on his or her subscription, but on the specific behaviour of the user entity the user is using. This information may be made available in the network entity, e.g. the RAN entity.

According to a first aspect, a network entity for providing a service for a user entity in a communication network is provided, the network entity having a determiner for determining at least one behaviour indication indicating a behaviour of the user entity during a communication towards the communication network, an allocator for allocating said user entity to a certain user entity group from a plurality of user entity groups in dependence on the determined at least one behaviour indication, said certain user entity groups being respectively associated with a different set of management parameters adjusting said service, and an adjuster for adjusting said service for said user entity in dependence on the set of management parameters associated with the certain user entity group.

The network entity may be a Radio Network Controller (RNC) or a Radio Access Network (RAN) entity. The communication network may be a mobile communication network, in particular comprising a core network (CN).

The determiner may be any determining means. Furthermore, the allocator may be any allocating means. Moreover, the adjuster may be any adjusting means.

The respective means, in particular the determiner, the allocator and the adjuster, may be implemented in hardware or in software. If said means are implemented in hardware, it may be embodied as a device, e.g. as a computer or as a processor, or as a part of a system, e.g. a computer system. If said means are implemented in software, it may be embodied as a computer program product, as a function, as a routine, as a program code or as an executable object.

The respective user entity may be embodied as user device, a mobile device or mobile terminal, in particular as a smart phone.

According to an implementation form, said determiner may be configured to determine a frequency of occurrence of an establishment of short packet data sessions established by the user entity. In this regard, said allocator may be configured to allocate said user entity to the certain user entity group in dependence on the determined frequency of occurrence.

According to an implementation form, said determiner may be configured to determine a volume of data transferred by the user entity during a defined number of short packet data sessions. In this regard, said allocator may be configured to allocate said user entity to the certain user entity group in dependence on the determined volume of data.

According to an implementation form, said allocator may be configured to allocate said user entity to the certain user entity group by means of comparing said detected at least one behaviour indication with a set of thresholds. A respective threshold may be associated with a respective user entity group.

According to an implementation form, the at least one behaviour indication may include a frequency of occurrence of an establishment of short data packet sessions established by the user entity, a volume of data transferred by the user entity during a defined number of short packet data sessions, and/or a duration of a short packet data session established by the user entity.

The classification algorithm for determining at least one behaviour indication may use above mentioned configurable parameters to decide on the user entity group the user entity may belong to. In particular, the frequency of occurrence may be the time elapsed since the last similar session. A further classification parameter may be the number of minimum sessions for which the classification criteria have been met successfully. The adjustment of these parameters may impact the performance of the classification algorithm, i.e. a probability of good classification and the speed of classification. When above mentioned conditions may be met, a user entity may be deemed to be successfully classified. The next time, the same user entity establishes a call to the communication network, differentiated processing may be applied to it in order to minimize the impact on the communication network.

According to an implementation form, the at least one behaviour indication may include a state transition indication indicating a state transition of the user entity.

According to an implementation form, the determiner may be configured to measure duration of at least one Radio Resource Control (RRC) state transition of the user entity. Then, the allocator may be configured to allocate said user entity to the certain user entity group in dependence on the measured duration.

According to an implementation form, the communication network may be a UMTS network. In this regard, the determiner may be configured to determine a first indication indicating a transition of the user entity from a Cell_DCH status to an idle status and to determine a second indication indicating whether the transition is under control of the communication network. Thus, said allocator may be configured to allocate said user entity to the certain user entity group in dependence on the first indication and/or the second indication.

Thus, another classification criterion may involve the duration of at least one RRC status transition of the user entity. In particular, in the case of an UMTS communication network, whether the user entity transition is directly from the Cell_DCH status to an idle status and whether this transition is under control of infrastructure, in particular the communication network, or not. In particular, the Cell_DCH status may be a special RRC state. It may be characterized by a dedicated physical channel allocated to the user entity in uplink and downlink. Thus, the user entity may be known on cell level according to its current active set. Further, dedicated transport channels, downlink and uplink shared transport channels and a combination of these transport channels may be used by the user entity in Cell_DCH state or mode. In particular, a number of conventional mobile devices implement such techniques in order to optimize their battery life, which in turn may create problems in the communication network. If such a behaviour is observed, in particular a fast transition to idle status not under control of the infrastructure, then such a user entity may be classified into a group for which differentiated processing may be applied.

According to an implementation form, said adjuster may be configured to select at least one communication channel from a plurality of available communication channels for the user entity in dependence on the set of management parameters associated with the certain user entity group.

The available communication channels may include all communication channels which are available in the moment the adjuster has to select at least one communication channel for the respective user entity.

The network entity may set up a new call coming from a successfully classified user entity on different types of channels, e.g. in an UMTS network either on Dedicated Channels (DCH) or common channels, e.g. Random Access Channel (RACH), Forward Access Channel (FACH), or High Speed Packet Access (HSPA) channel.

According to an implementation form, said adjuster may be configured to apply at least one control parameter for controlling Radio Resource Control (RRC) state transitions of the user entity.

Further, the network entity may apply different parameters to control the RRC state transitions of the user entities. For example, thresholds used for traffic volume measurement may report and inactivity timers may be used to control the RRC state transitions.

According to an implementation form, said adjuster may be configured to enable the user entity to be connected to the communication network for an increased duration for enabling a setup of a new call of said user entity within said increased duration.

The increased duration may be a duration which is longer than the duration necessary for the actual call.

The network entity may decide to maintain a user entity of a given group in connected mode for the increased duration, because it is very likely that such a user entity setups a new call in a short term which may be part of the increased duration. In sum, it may be more economical to maintain the RRC connection rather than to release it.

According to an implementation form, the determiner includes a provider and a deriver, wherein said provider is configured to provide a user entity indication indicating a type of the user entity communicating towards the communication network, and wherein said deriver is configured to derive said at least one behaviour indication from the provided user entity indication.

According to an implementation form, the network entity may comprise a monitor being configured to monitor messages for extracting a transferred International Mobile station Equipment Identity (IMEI). The IMEI may be an example of the user entity indication. E.g., the messages may be transferred between the communication network and the user entity. In particular, the monitored messages may be signaling messages transferred between the communication network and the certain user entity.

The IMEI may be an identifier identifying a user entity or user device. In addition, the IMEI may be a number with 15 digits. Moreover, it may be allocated by a centralized body to equipment manufacturers. The IMEI may be structured as follows:

TAC(8-digits)+SNR(6-digits)+Spare(1-digit)

wherein TAC may designate a Type Allocation Code, e.g. allocated by a central body, SNR may designate a Serial Number, e.g. allocated by a manufacturer, and Spare may designate a key to check integrity of the TAC and the SNR.

According to an implementation form, the network entity may comprise a monitor, a monitoring unit or a monitoring device. Said monitor may be configured to decode signaling messages transferred over a communication channel, to identify an IMEI check procedure in dependence on said decoding and to extract the IMEI transferred in said identified IMEI check procedure. Said signaling messages, e.g. direct transfer messages, may be transferred between the communication network and the certain user entity. Further, the communication channel may comprise the communication network, e.g. a core network, and a number of base stations coupling user entities. Furthermore, said monitor, e.g. located in the RNC, may detect messages normally destined to the core network and may decode a particular type of such messages, but without interfering with the delivery of such message to the core network.

According to an implementation form, the network entity may comprise a further determiner, a determining unit or a determining device. Said further determiner may be configured to determine the type of the certain user entity communicating towards the communication network dependent on an IMEI extracted from messages, in particular signaling messages, transferred between the communication network and the certain user entity. The type of the certain user entity may be an example of the at least one behaviour indication indicating a behaviour of the user entity during a communication towards the communication network.

According to an implementation form, the network entity may comprise a monitor and a further determiner. Said monitor may be configured to snoop direct transfer messages transferred between the communication network and the certain user entity. Furthermore, said monitor may be configured to identify an IMEI check procedure in dependence on said snooping and to extract the IMEI transferred in said identified IMEI check procedure. In addition, said further determiner may be configured to interrogate a local or a remote database for determining the type of the certain user entity communicating towards said communication network dependent on the extracted IMEI.

For example, in UMTS, the communication network, in particular the core network may send an IMEI check message to the user entity which may respond with some information including its IMEI and optionally its software version. Said information including the IMEI may be snooped by the monitor. As mentioned, said monitor may provide the IMEI to the further determiner. Once the further determiner has the IMEI, it may send a request to an Equipment Identity Register (EIR). The equipment identity register (EIR) may be a database keeping a record of stolen user entities. Moreover, the EIR may maintain different lists of IMEIs, e.g. a white list, a grey list and a black list. The black-listed user entities may be forbidden to access the communication network.

According to an implementation form, said set of management parameters includes at least one Quality of Service (QoS) parameter defining the provided QoS for the certain user entity, at least one channel allocation parameter for allocating channels to the certain user entity, and/or at least one radio resources management parameter for controlling co-channel interference and/or radio transmission characteristics.

According to an implementation form, the communication network belongs at least to one of the communication network technologies: Universal Mobile Telecommunication System (UMTS), Global System for Mobile Communications (GSM), Long-Term Evolution (LTE), and Code-Division Multiple Access 2000 (CDMA 2000).

According to an implementation form, said determiner, said allocator and said adjuster may be part of or integrated in a controller.

According to an implementation form, the controller may be configured to adjust at least one RAN-specific QoS parameter. In particular, the controller may be configured to give at least one certain user entity a higher throughput.

According to an implementation form, the controller may be configured to adjust at least one management parameter for a HSDPA scheduler of a NodeB base station in a UMTS system. In particular, the controller may be configured to alter a throughput or a delay for a certain user entity.

According to an implementation form, the controller may be configured to handle network trouble-shooting in dependence on a plurality of determined behaviour indications of a plurality of user entities communicating towards the communication network.

According to another aspect, the invention relates to a communication system having a plurality of above mentioned network entities.

According to another aspect, the invention relates to a method for providing a service for a user entity in a communication network, the method having a step of determining at least one behaviour indication indicating a behaviour of the user entity during a communication towards the communication network, a step of allocating said user entity to a certain user entity group from a plurality of user entity groups in dependence on the determined at least one behaviour indication, said certain user entity groups being respectively associated with a different set of management parameters adjusting said service, and a step of adjusting said service for said user entity in dependence on the set of management parameters associated with the certain user entity group.

According to another aspect, the invention relates to a computer program comprising a program code for executing the method for providing a service for a user entity in a communication network when run in a computer.

BRIEF DESCRIPTION OF THE DRAWINGS

Further embodiments of the invention will be described with respect to the following figures, in which.

DETAILED DESCRIPTION

Figure 1:
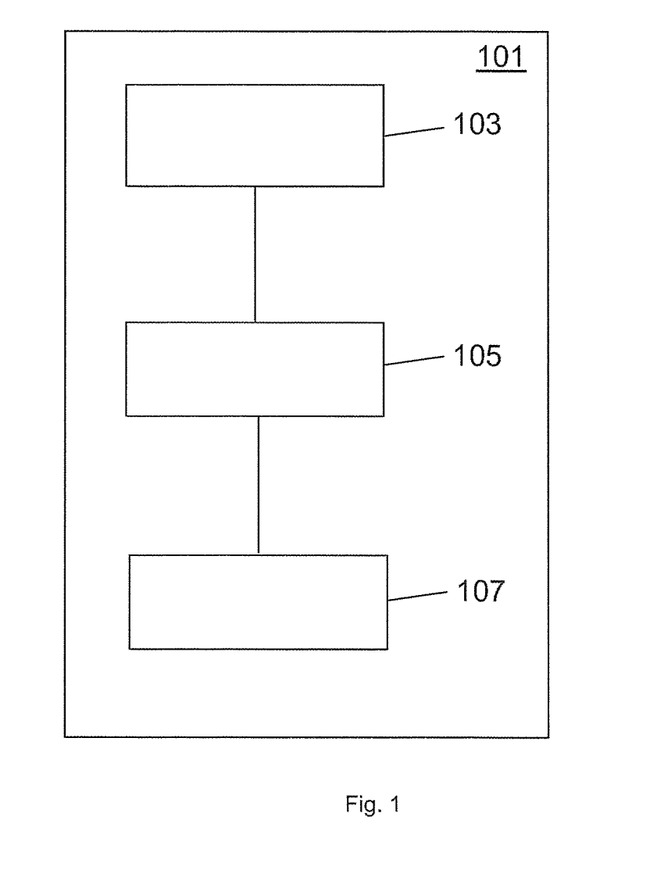
FIG. 1 shows a first embodiment of a network entity for providing a service for a user entity in a communication network.

In FIG. 1, a first embodiment of a network entity 101 for providing a service for a user entity in a communication network is shown.

The network entity 101 may have a determiner 103, an allocator 105 and an adjuster 107.

The determiner 103 may be adapted to detect at least one behaviour indication of the user entity. The behaviour indication may indicate the behaviour of the user entity during a communication towards the communication network.

The allocator 105 may be adapted to allocate said user entity to a certain user entity group. The certain user entity group may be from a plurality of user entity groups. Said allocator 105 may proceed said allocation step in dependence on the determined at least one behaviour indication. Said certain user entity groups may be respectively associated with a different set of management parameters adjusting said service.

Said allocator 105 may be further configured to allocate said user entity to the certain user entity group be means of comparing said detected at least one behaviour indication with a set of thresholds. A respective threshold may be associated with the respective user entity group.

The adjuster 107 may be adapted to adjust said service for said user entity in dependence on the set management parameters associated with the certain user entity group.

Particularly, said determiner 103 may be adapted to determine a frequency of occurrence of an establishment of short packet data sessions established by the user entity. In such a case, said allocator 105 may be adapted to allocate said user entity to the certain user entity group in dependence on the determined frequency of occurrence.

Further, said determiner 103 may be particularly adapted to determine a volume of data transferred by the user entity during a defined number of short packet data sessions. In such a case, said allocator 105 may be configured to allocate said user entity to the certain user entity group in dependence on the determined volume of data.

Moreover, the determiner 103 may be adapted to measure duration for at least one RRC state transition of the user entity.

In such a case, the allocator 105 may be adapted to allocate said user entity to the certain user entity group in dependence on the measured duration.

Moreover, the determiner 103 may be adapted to determine a first indication and a second indication. The first indication may indicate a transition of the user entity from a Cell_DCH status to an idle status. Said second indication may indicate whether the transition is under the control of the communication network. In such a case, said allocator 105 may be adapted to allocate said user entity to the certain user entity group in dependence on the first indication and the second indication.

Furthermore, said adjuster 107 may be adapted to select at least one communication channel from a plurality of an available communication channels for the user entity in dependence on the set of management parameters associated with the certain user entity group.

Also, said adjuster 107 may be adapted to apply at least one control parameter for controlling RRC state transitions of the user entity. In particular, the adjuster 107 may enable the user entity to be connected to the communication network for an increased duration to enable a setup of a new call within said increased duration.

Figure 2:
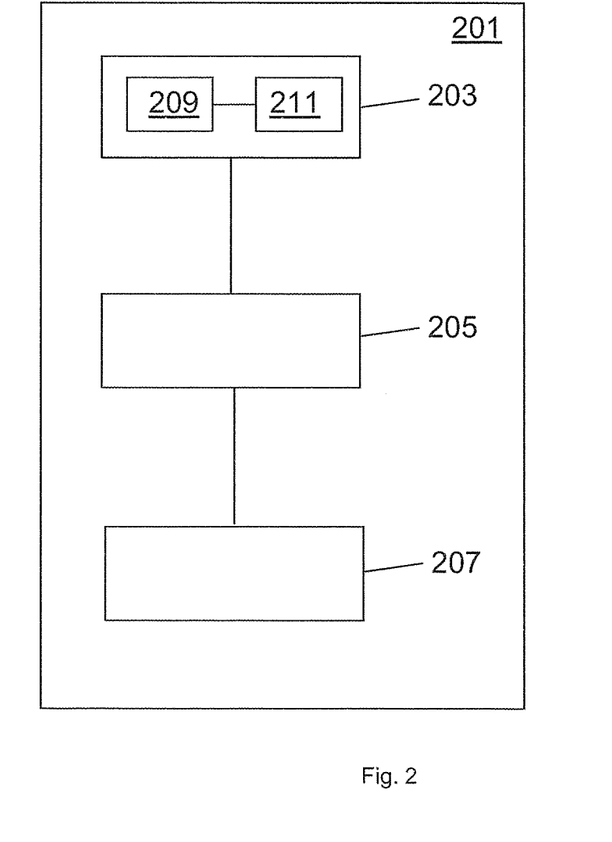
FIG. 2 shows a second embodiment of a network entity for providing a service for a user entity in a communication network.

FIG. 2 shows a second embodiment of network entity 201 for providing a service for user entity in a communication network. The network entity 201 may have a determiner 203, an allocator 205 and an adjuster 207.

The determiner 203 may be adapted to detect at least one behaviour indication of the user entity. The behaviour indication may indicate the behaviour of the user entity during a communication towards the communication network.

Referring to FIG. 2, the determiner 203 may include a provider 209 and a deriver 211. Said provider 209 may be adapted to provide a user entity indication indicating a type of the user entity communicating towards the communication network. Furthermore, said deriver 211 may be adapted to derive said at least one behaviour indication from the provided user entity indication.

The allocator 205 may be adapted to allocate said user entity to a certain user entity group. The certain user entity group may be from a plurality of user entity groups. Said allocator 205 may proceed said allocation step in dependence on the determined at least one behaviour indication. Said certain user entity groups may be respectively associated with a different set of management parameters adjusting said service.

Said allocator 205 may be further configured to allocate said user entity to the certain user entity group be means of comparing said detected at least one behaviour indication with a set of thresholds. A respective threshold may be associated with the respective user entity group.

The adjuster 207 may be adapted to adjust said service for said user entity in dependence on the set management parameters associated with the certain user entity group.

Figure 3:
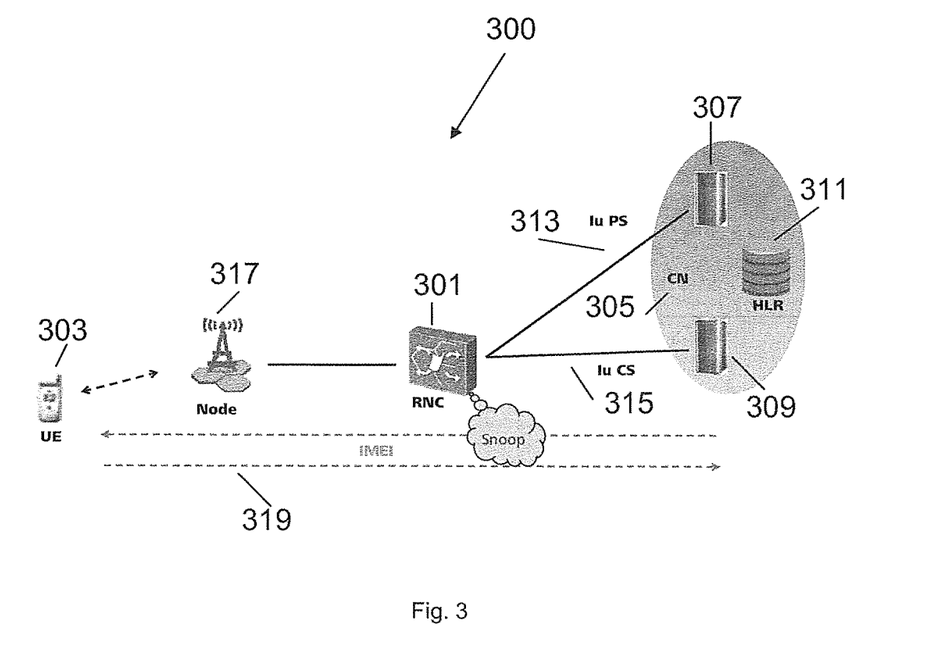
FIG. 3 shows an embodiment of a communication system having a network entity, a user entity and a communication network.

FIG. 3 shows, by way of example, an embodiment of communication system 300 having a network entity 301, a user entity 303 and a communication network 305.

The network entity 301 may be embodied as the network entity 101 of FIG. 1. Moreover, the network entity 301 may be embodied as the network entity 201 of FIG. 2. Further, the network entity 301 may be embodied as a Radio Network Controller (RNC) or as a RAN entity.

In addition, said communication network 305 may be embodied as a core network (CN). Said CN 305 may have a 3G Serving GPRS Support Node (3G SGSN) 307, a 3G Mobile Switching Center (MSC) 309, and a Home Location Register (HLR) 311. The 3G SGSN 307 and the network entity 301 may be coupled by an IU PS (Packet Switched) Interface 313. Moreover, said 3G MSC 309 may be coupled with said network entity 301 via an Iu CS (Circuit Switched) Interface 315.

Furthermore, said network entity 301 and said user entity 303 may be coupled by a base station 317.

As shown in FIG. 3, the network entity 301 may be adapted to snoop a communication 319 between the core network 305 and the user entity 303, said communication 319 may include at least one behaviour indication indicating a behaviour of the user entity during the communication 319 towards or with the communication network.

Figure 4:
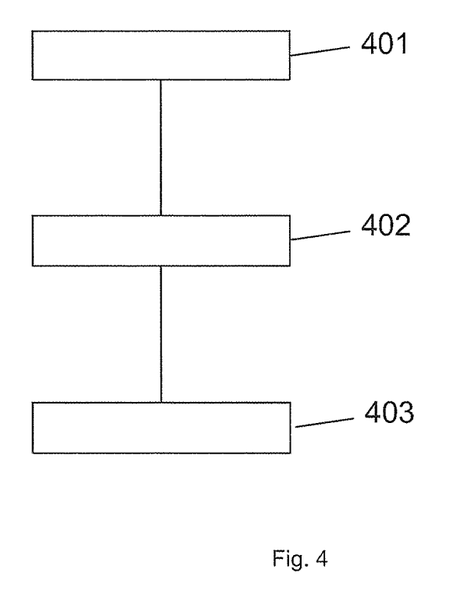
FIG. 4 shows an embodiment of a method for providing a service for a user entity in a communication network.

In FIG. 4, an embodiment of the method for providing a service for a user entity in a communication network is depicted.

As shown in FIG. 4, the method comprises a step of determining 401 at least one behaviour indication indicating a behaviour of the user entity during a communication towards the communication network.

Further, the method comprises a step of allocating 402 said user entity to a certain user entity group from a plurality of user entity groups in dependence on the determined at least one behaviour indication, said certain user entity groups being respectively associated with a different set of management parameters adjusting said service.

Also, the method comprises a step of adjusting 403 said service for said user entity in dependence on the set of management parameters associated with the certain user entity group.

According to some implementations, a user entity-based service in a communication network, e.g. in GSM, in UMTS or in LTE technologies, is enabled.

According to some implementations, the present network entity may adjust at least one RAN-specific QoS parameter. In particular, such an adjusting may enable at least one certain user entity to communicate with a higher throughput.

Further, according to some implementations, at least one management parameter for a HSDPA scheduler of a NodeB base station in a UMTS system may be adjusted, in particular to alter a throughput or a delay for certain user entities.

According to some implementations, the network entity, in particular the controller of the network entity, may handle network trouble-shooting in dependence on a plurality of provided user entity indications of a plurality of user entities communicating with the communication network.

What is claimed is:

1. A network entity for providing a service for a user entity in a wireless communication network, the network entity comprising:
a determiner, configured to determine at least one behaviour indication indicating a behaviour of the user entity during a communication towards the wireless communication network; wherein the at least one behaviour indication includes a frequency of occurrence of an establishment of short data packet sessions established by the user entity; wherein the wireless communication network belongs at least to one of the communication network technologies: Universal Mobile Telecommunication System (UMTS), Global System for Mobile Communications (GSM), Long-Term Evolution (LTE), and Code-Division Multiple Access 2000 (CDMA 2000);
an allocator, configured to allocate said user entity to a certain user entity group from a plurality of user entity groups in dependence on the determined at least one behaviour indication, said certain user entity groups being respectively associated with a different set of management parameters adjusting said service; and
an adjuster, configured to adjust said service for said user entity in dependence on the set of management parameters associated with the certain user entity group for providing the service to the user entity;
wherein said determiner is further configured to determine a frequency of occurrence of an establishment of short packet data sessions established by the user entity, wherein said allocator is configured to allocate said user entity to the certain user entity group in dependence on the determined frequency of occurrence;
wherein the determiner is configured to determine a first indication indicating a transition of the user entity from a Cell Dedicated Channel (Cell_DCH) status to an idle status and to determine a second indication indicating whether the transition is under control of the wireless communication network, wherein said allocator is configured to allocate said user entity to the certain user entity group in dependence on the first indication and the second indication.

2. The network entity of claim 1, wherein said determiner is configured to determine a volume of data transferred by the user entity during a defined number of short packet data sessions, wherein said allocator is configured to allocate said user entity to the certain user entity group in dependence on the determined volume of data.

3. The network entity of claim 1, wherein said allocator is configured to allocate said user entity to the certain user entity group by means of comparing said detected at least one behaviour indication with a set of thresholds, a respective threshold being associated with a respective user entity group.

4. The network entity of claim 1, wherein the at least one behaviour indication further includes a volume of data transferred by the user entity during a defined number of short packet data sessions, and/or a duration of a short packet data session established by the user entity.

5. The network entity of claim 1, wherein the at least one behaviour indication includes a state transition indication indicating a state transition of the user entity.

6. The network entity of claim 1, wherein the determiner is configured to measure a duration for at least one Radio Resource Control (RRC) state transition of the user entity, wherein the allocator is configured to allocate said user entity to the certain user entity group in dependence on the measured time duration.

7. The network entity of claim 1, wherein the determiner comprises a provider and a deriver, wherein said provider is configured to provide a user entity indication indicating a type of the user entity communicating towards the wireless communication network, and wherein said deriver is configured to derive said at least one behaviour indication from the provided user entity indication.

8. The network entity of claim 1, wherein said adjuster is configured to select at least one communication channel from a plurality of available communication channels for the user entity in dependence on the set of management parameters associated with the certain user entity group.

9. The network entity claim 1, wherein said adjuster is configured to apply at least one control parameter for controlling Radio Resource Control (RRC) state transitions of the user entity.

10. The network entity of claim 1, wherein said adjuster is configured to enable the user entity to be connected to the wireless communication network for an increased duration for enabling a setup of a new call of said user entity within said increased duration.

11. A method for providing a service for a user entity in a wireless communication network, the method comprising:
determining, by a network entity, at least one behaviour indication indicating a behaviour of the user entity during a communication towards the wireless communication network; wherein the at least one behaviour indication includes a frequency of occurrence of an establishment of short data packet sessions established by the user entity; wherein the wireless communication network belongs at least to one of the communication network technologies: Universal Mobile Telecommunication System (UMTS), Global System for Mobile Communications (GSM), Long-Term Evolution (LTE), and Code-Division Multiple Access 2000 (CDMA 2000);
allocating, by the network entity, said user entity to a certain user entity group from a plurality of user entity groups in dependence on the determined at least one behaviour indication, said certain user entity groups being respectively associated with a different set of management parameters adjusting said service; and
adjusting, by the network entity, said service for said user entity in dependence on the set of management parameters associated with the certain user entity group;
wherein the method further comprises:
determining, by the network entity, a frequency of occurrence of an establishment of short packet data sessions established by the user entity;
allocating, by the network entity, the user entity to the certain user entity group in dependence on the determined frequency of occurrence;
determining, by the network entity, a first indication indicating a transition of the user entity from a Cell Dedicated Channel (Cell_DCH), status to an idle status; and determining a second indication indicating whether the transition is under control of the wireless communication network; and
allocating, by the network entity, the user entity to the certain user entity group in dependence on the first indication and the second indication.

12. The method of claim 11, the at least one behaviour indication further includes a volume of data transferred by the user entity during a defined number of short packet data sessions, and a duration of a short packet data session established by the user entity.

13. The method of claim 11, further comprising:
measuring, by the network entity, a duration for at least one Radio Resource Control (RRC) state transition of the user entity; and
allocating, by the network entity, the user entity to the certain user entity group in dependence on the measured time duration.

14. A system for providing a service for a user entity in a wireless communication network, the system comprising:
a network entity, comprising:
a determiner, configured to determine at least one behaviour indication indicating a behaviour of the user entity during a communication towards the wireless communication network, wherein the at least one behaviour indication includes a frequency of occurrence of an establishment of short packet data sessions established by the user entity; wherein the wireless communication network belongs at least to one of the communication network technologies: Universal Mobile Telecommunication System (UMTS), Global System for Mobile Communications (GSM), Long-Term Evolution (LTE), and Code-Division Multiple Access 2000 (CDMA 2000);
an allocator, configured to allocate said user entity to a certain user entity group from a plurality of user entity groups in dependence on the determined at least one behaviour indication, said certain user entity groups being respectively associated with a different set of management parameters adjusting said service, and
an adjuster, configured to adjust said service for said user entity in dependence on the set of management parameters associated with the certain user entity group for providing the service to the user entity;
the network entity and the user entity are coupled by a base station; and
the network entity is configured to snoop a communication between the wireless communication network and the user entity, the communication comprises the at least one behavior indication indicating the behavior of the user entity during the communication towards the wireless communication network; wherein
the determiner is further configured to determine a frequency of occurrence of an establishment of short packet data sessions established by the user entity, wherein said allocator is configured to allocate said user entity to the certain user entity group in dependence on the determined frequency of occurrence;
wherein the determiner is configured to determine a first indication indicating a transition of the user entity from a Cell Dedicated Channel (Cell_DCH) status to an idle status and to determine a second indication indicating whether the transition is under control of the wireless communication network, wherein said allocator is configured to allocate said user entity to the certain user entity group in dependence on the first indication and the second indication.

15. A non-transitory computer program product comprising computer program code, which, when executed by a computer unit, will cause the computer unit to:
determine at least one behaviour indication indicating a behaviour of the user entity during a communication towards the wireless communication network; wherein the at least one behaviour indication includes a frequency of occurrence of an establishment of short data packet sessions established by the user entity; wherein the wireless communication network belongs at least to one of the communication network technologies: Universal Mobile Telecommunication System (UMTS), Global System for Mobile Communications (GSM), Long-Term Evolution (LTE), and Code-Division Multiple Access 2000 (CDMA 2000);
allocate said user entity to a certain user entity group from a plurality of user entity groups in dependence on the determined at least one behaviour indication, said certain user entity groups being respectively associated with a different set of management parameters adjusting said service; and
adjust said service for said user entity in dependence on the set of management parameters associated with the certain user entity group;
determine a frequency of occurrence of an establishment of short packet data sessions established by the user entity;
allocate the user entity to the certain user entity group in dependence on the determined frequency of occurrence;
determine, by the network entity, a first indication indicating a transition of the user entity from a Cell Dedicated Channel (Cell_DCH), status to an idle status; and determine a second indication indicating whether the transition is under control of the wireless communication network; and allocate, by the network entity, the user entity to the certain user entity group in dependence on the first indication and the second indication.

* * * * *